(12) United States Patent
Hashimoto et al.

(10) Patent No.: US 7,839,042 B2
(45) Date of Patent: Nov. 23, 2010

(54) INDUCTOR MOTOR AND MANUFACTURING METHOD OF INDUCTOR MOTOR

(75) Inventors: Tomihiko Hashimoto, Nishiwaki (JP); Shigetsugu Ozaki, Okazaki (JP); Shigechika Kobayashi, Toyohashi (JP); Takashi Kato, Kasugai (JP)

(73) Assignee: Shinsei Seiki Co., Ltd, Kasai-shi (JP)

( * ) Notice: Subject to any disclaimer, the term of this patent is extended or adjusted under 35 U.S.C. 154(b) by 109 days.

(21) Appl. No.: 12/227,984

(22) PCT Filed: Oct. 17, 2006

(86) PCT No.: PCT/JP2006/320677

§ 371 (c)(1),
(2), (4) Date: Jan. 12, 2009

(87) PCT Pub. No.: WO2007/144966

PCT Pub. Date: Dec. 21, 2007

(65) Prior Publication Data

US 2009/0167106 A1    Jul. 2, 2009

(30) Foreign Application Priority Data

Jun. 14, 2006  (JP) .............................. 2006-165184

(51) Int. Cl.
*H02K 1/27* (2006.01)
*H02K 21/14* (2006.01)

(52) U.S. Cl. .............................. 310/156.35; 310/49.15; 310/166; 310/257

(58) Field of Classification Search .............. 310/49.02, 310/49.06, 49.08–49.17, 49.32, 49.36, 49.43, 310/156.35–156.37, 166–167, 257
See application file for complete search history.

(56) References Cited

U.S. PATENT DOCUMENTS

| 6,153,953 | A | 11/2000 | Isozaki et al. |
| 6,479,911 | B1 * | 11/2002 | Koike et al. ............... 310/49.24 |
| 6,700,261 | B2 * | 3/2004 | Mayumi ...................... 310/91 |
| 6,822,351 | B2 | 11/2004 | Matsushita et al. |
| 7,095,148 | B2 | 8/2006 | Mayumi |
| 7,164,216 | B2 * | 1/2007 | Shimoyama ............. 310/49.32 |
| 7,635,931 | B2 * | 12/2009 | Suzuki et al. ............ 310/49.37 |

FOREIGN PATENT DOCUMENTS

| JP | U-63-113475 | 7/1988 |
| JP | A-09-233801 | 9/1997 |
| JP | A-10-084663 | 3/1998 |

(Continued)

*Primary Examiner*—Tran N Nguyen
(74) *Attorney, Agent, or Firm*—Oliff & Berridge, PLC

(57) ABSTRACT

An inductor motor includes a stator block, a substantially cylindrical excitation coil, and a rotor including two substantially columnar magnet rotors coaxially arranged, and the magnet rotors are individually inserted inside two stator blocks coaxially arranged. The stator is formed of a substantially flat plate-shaped preformed member of a magnetic material having a plurality of protruding pieces circumferentially formed and protruding radially outwardly, and has stator teeth formed by bending the protruding pieces to stand up. The rotor has an intermediate circumferential groove with a smaller diameter than a magnet portion between the two magnet rotors coaxially arranged. A holding plate portion of the stator placed on an axially intermediate side in each stator block is placed around the intermediate circumferential groove of the rotor.

10 Claims, 11 Drawing Sheets

FOREIGN PATENT DOCUMENTS

| | | |
|---|---|---|
| JP | A-11-055928 | 2/1999 |
| JP | 2003174760 A * | 6/2003 |
| JP | A-2004-120942 | 4/2004 |
| JP | A-2004-140925 | 5/2004 |
| JP | A-2005-057991 | 3/2005 |
| JP | A-2005-151741 | 6/2005 |
| JP | A-2005-192386 | 7/2005 |
| JP | A-2006-136108 | 5/2006 |
| JP | 2006254556 A * | 9/2006 |
| JP | 2006280039 A * | 10/2006 |

* cited by examiner

INDUCTOR MOTOR AND MANUFACTURING METHOD OF INDUCTOR MOTOR

TECHNICAL FIELD

The present invention relates to an inductor motor using a permanent magnet in a rotor.

BACKGROUND ART

An inductor motor using a permanent magnet in a rotor has been known. In such an inductor motor 9, for example, as shown in FIGS. 14 and 15, a stator block 91 including stators 911 and 912 holding an excitation coil 910 therebetween, and a stator block 92 including stators 921 and 922 holding an excitation coil 920 therebetween are stacked in two rows, and a substantially columnar rotor 93 having an outer peripheral surface multi-pole magnetized so that N-poles and S-poles are circumferentially alternately arranged is placed inside the stator blocks 91 and 92 (for example, see Patent Document 1).

As shown in FIGS. 14 and 15, the stators 911, 912, 921 and 922 each have a plurality of stator teeth protruding in the stacking direction on substantially the same circumference. FIG. 15 shows an imaginary arrangement of the stator teeth unrolled on a plane. In the stator blocks 91 and 92, the stator 911 (921) and the stator 912 (922) are placed to face each other so that their stator teeth protruding toward each other interdigitate with each other. In the inductor motor 9, as shown in FIG. 15, a phase of the stator block 92, that is, a position in a rotational direction thereof is shifted from that of the stator block 91. A phase difference G between the stator block 91 and the stator block 92 is set, for example, to a rotation angle corresponding to one forth of a formation pitch of the stator teeth.

In the inductor motor 9 configured as described above, energizing the excitation coil 910 (920) magnetizes the facing stator 911 (921) and stator 912 (922) to have different polarities. Specifically, in the stator block 91 (92), the stator teeth arranged on the same circumference can be circumferentially alternately magnetized to N-poles or S-poles.

In the inductor motor 9, the excitation coils 910 and 920 are energized according to a predetermined sequence to alternately switch polarities of the stator teeth with time. Alternately switching the polarities of the stator teeth allows repeated attraction or repulsion between the N-poles or the S-poles on the outer peripheral surface of the rotor 93 and the stator teeth. Then, the running torque of the rotor 93 can be generated on the basis of an attractive force or a repulsive force applied to the N-poles and the S-poles on the outer peripheral surface of the rotor 93. In the inductor motor 9, as described above, the stator blocks 91 and 92 are stacked in the shifted manner in the rotational direction, and thus the rotor 93 can be rotated in a predetermined direction.

The stators 911, 912, 921 and 922 that are components of the inductor motor 9 are each formed of, for example, a substantially flat plate-shaped member of a magnetic material by boring a hole in the member to leave a plurality of protruding pieces protruding inwardly, and then bending the protruding pieces from their roots to stand up. By such machining steps using the substantially flat plate-shaped member, inexpensive stators can be extremely efficiently produced by press working such as stamping or bending. The inductor motor 9 using the inexpensive stators 911, 912, 921 and 922 can be a product with high cost performance.

However, the conventional inductor motor has the following problem. Specifically, in the inductor motor using the stator formed of the substantially flat plate-shaped member, a length of the stator teeth is limited by an outer diameter of the inductor motor, and therefore the running torque that can be outputted may not be sufficiently ensured depending on the outer diameter.

Patent Document 1: Japanese Patent Laid-open No. 10-84663

DISCLOSURE OF THE INVENTION

Problems to be Solved by the Invention

The present invention is achieved in view of the above described conventional problem, and has an object to provide an inductor motor that can achieve a high output characteristic even with a small diameter.

Means for Solving the Problems

The first invention provides an inductor motor including: a stator having a plurality of stator teeth standing along substantially the same circumference from a substantially flat plate-shaped holding plate portion; a stator block including a pair of stators placed to face each other so that the stator teeth circumferentially alternately interdigitate with each other; a substantially cylindrical excitation coil placed around the stator block; a rotor including two substantially columnar magnet rotors coaxially arranged, each magnet rotor including a magnet portion in which a magnetized surface having N-poles and S-poles circumferentially alternately arranged thereon is provided on an outer peripheral surface; and a motor case that houses the stator block around which the excitation coil is placed, the two magnet rotors being placed inside the two stator blocks coaxially arranged respectively, characterized in that each of the stators is formed of a substantially flat plate-shaped preformed member of a magnetic material having a plurality of protruding pieces circumferentially formed and protruding radially outwardly, and has the stator teeth formed by bending the protruding pieces to stand up, the rotor has an intermediate circumferential groove with a smaller diameter than the magnet portion between the two magnet rotors coaxially arranged, and the holding plate portion of the stator placed on an axially intermediate side of the inductor motor is placed around the intermediate circumferential groove.

The stator of the inductor motor of the first invention is formed of the substantially flat plate-shaped preformed member having the plurality of protruding pieces circumferentially formed and protruding radially outwardly. The stator teeth of the stator are formed by bending the protruding pieces of the preformed member to stand up.

In the preformed member, the protruding pieces protrude radially outwardly around a portion to be the holding plate portion of the stator. A protrusion length of each protruding piece can be freely set without depending on size specifications such as a diameter of the holding plate portion to be formed or the like. The protrusion length of each protruding piece is merely limited by a size of a material from which the preformed member is stamped. Specifically, in the stator, the protrusion length of the stator teeth can be freely set independently of outer diameter specifications or the like required for the inductor motor.

In the inductor motor in which the protrusion length of the stator teeth can be set independently of the outer diameter specifications or the like, an increase in the protrusion length of the stator teeth can achieve a high output characteristic of the inductor motor. For example, when the diameter of the inductor motor needs to be reduced, the axial length thereof can be increased to sufficiently ensure an output.

As described above, the inductor motor of the first invention has an excellent configuration that can achieve a high output characteristic even with a small diameter.

A second invention provides a manufacturing method of an inductor motor including: a stator having a plurality of stator teeth standing along substantially the same circumference from a substantially flat plate-shaped holding plate portion; a stator block including a pair of stators placed to face each other so that the stator teeth circumferentially alternately interdigitate with each other; a substantially cylindrical excitation coil placed around the stator block; a rotor including two magnet rotors coaxially arranged, each magnet rotor including a magnet portion in which a magnetized surface having N-poles and S-poles circumferentially alternately arranged thereon is provided on an outer peripheral surface, and having an intermediate circumferential groove with a smaller diameter than the magnet portion between the magnet rotors; and a motor case that houses the stator block around which the excitation coil is placed, the two magnet rotors being placed inside the two stator blocks coaxially arranged respectively, characterized in that the method includes: a first rotor placement step of placing and securing the magnet rotors around a first rotation shaft, each magnet rotor having a rotor positioning portion that controls a relative position in a rotational direction to the other magnet rotor that constitutes the rotor; a rotor magnetizing step of magnetizing outer peripheral surfaces of the magnet rotors placed and secured around the first rotation shaft to form the magnetized surfaces; a rotor removing step of removing at least one of the magnetized magnet rotors from the first rotation shaft; and a second rotor placement step of placing and securing the magnetized magnet rotors around a second rotation shaft so that the holding plate portions of the two stators placed with the stator teeth directed in opposite directions are placed around the intermediate circumferential groove, and the relative position in the rotational direction of the magnet rotors is controlled via the rotor positioning portion in the first and second rotor placement steps.

In the manufacturing method of an inductor motor of the second invention, the first rotor placement step of placing and securing the unmagnetized magnet rotors around the first rotation shaft, and the rotor magnetizing step of forming the magnetized surfaces on the magnet rotors placed and secured around the first rotation shaft are performed, and then the rotor removing step of removing at least one of the magnet rotors from the first rotation shaft is performed.

Then, in the manufacturing method of an inductor motor, the second rotor placement step of placing and securing the magnetized magnet rotors around the second rotation shaft is performed. The second rotor placement step is a step of placing and securing the magnetized magnet rotors around the second rotation shaft so that the holding plate portions of the two stators placed with the stator teeth directed in the axially opposite directions are placed around the intermediate circumferential groove.

In the second rotor placement step, as in the first rotor placement step, the rotor positioning portion is used to control the relative position in the rotational direction with high accuracy, and the magnet rotors are assembled to the second rotation shaft. Thus, by the manufacturing method of an inductor motor, the rotor magnetizing step and the rotor removing step are performed, and then the magnet rotors can be placed around the second rotation shaft with high positional accuracy by the second rotor placement step.

As described above, according to the manufacturing method of an inductor motor of the second invention, an inductor motor can be manufactured that includes the magnet rotors assembled with high positional accuracy and exhibits an excellent performance in compliance with design specifications.

DESCRIPTION OF SYMBOLS

Figure 1:
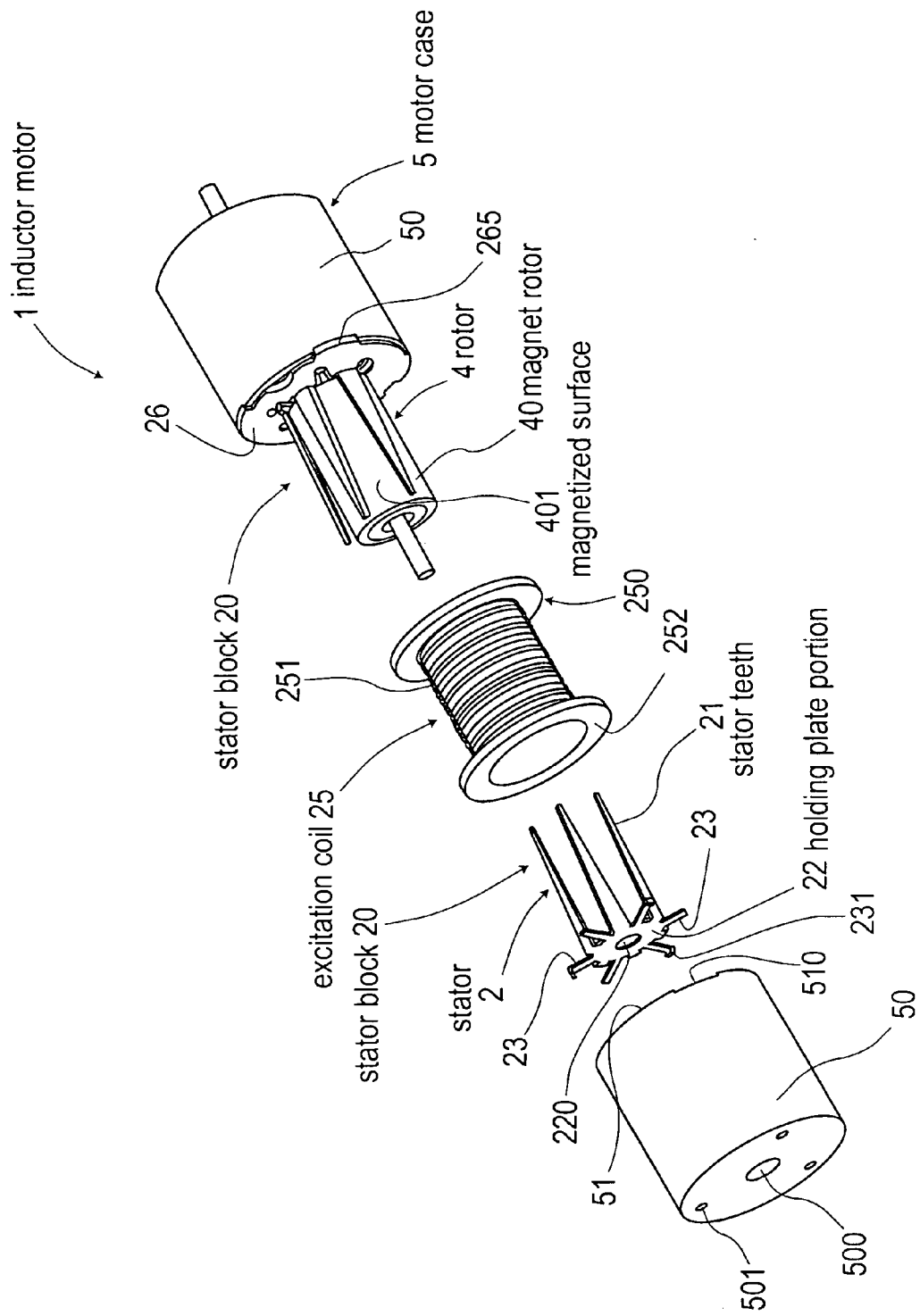
FIG. 1 is an assembly drawing of an assembly structure of an inductor motor in Embodiment 1.

| | |
|---|---|
| 1 | inductor motor |
| 2 | stator |
| 20 | stator block |
| 21 | stator teeth |
| 22 | holding plate portion |
| 25 | excitation coil |
| 26 | intermediate plate |
| 4 | rotor |
| 40 | magnet rotor |
| 401 | magnetized surface |
| 402 | small diameter portion |
| 41 | rotation shaft (second rotation shaft) |
| 411 | first rotation shaft |
| 42 | intermediate circumferential groove |
| 43 | magnet portion |
| 5 | motor case |
| 50 | case member |

BEST MODE FOR CARRYING OUT THE INVENTION

The intermediate circumferential groove in the first and second inventions includes one formed by an axial gap between the two magnet rotors placed around the rotation shaft, or one formed by a small diameter portion provided at an end on an axially intermediate side of either of the two magnet rotors.

It is preferable that the holding plate portions of the two stators placed on the axially intermediate side of the inductor motor, and a substantially flat plate-shaped intermediate plate configured to hold the holding plate portions on front and back surfaces thereof are placed around the intermediate circumferential groove of the rotor, and the pair of stators placed to face each other are magnetically connected via the intermediate plate of a magnetic material in the each stator block.

In this case, a magnetic path between the pair of stators that constitute the stator block can be ensured via the intermediate plate. For the stators placed on axially opposite sides of the inductor motor, for example, a magnetic path can be ensured by direct or indirect contact with an inner peripheral surface of the motor case of a magnetic material.

The intermediate plate preferably includes inner stator positioning portions that control positions in a rotational direction of the stators held via the holding plate portions.

In this case, the inner stator positioning portions in the intermediate plate can be used to control the positions in the rotational direction of the stators placed on the axially intermediate side of the inductor motor with high accuracy.

Further, it is preferable that the motor case includes two case members having outer stator positioning portions that control the positions in the rotational direction of the stators placed on the axially opposite sides of the inductor motor, and the intermediate plate has a case positioning portion that controls positions in a rotational direction of the case members.

In this case, the case positioning portion in the intermediate plate can be used to control a relative position in the rotational direction of the case members with high accuracy. Further, the outer stator positioning portions of the case members can be used to control the relative position in the rotational direction of the stators placed on the axially opposite sides of the inductor motor with high accuracy. Thus, the above described configuration allows the pair of stators that constitute the each stator block to be placed to face each other with high accuracy using the intermediate plate and the case member. Further, a relative position in the rotational direction of the two stator blocks coaxially arranged can be controlled with high accuracy.

At least any of the stators preferably holds a support member of a non-magnetic material configured to support tips of the stator teeth of the other stator that constitutes the stator block.

In this case, the support member held by the stator can be used to support the tips of the stator teeth of the other stator that constitutes the stator block. When a length in a protruding direction of the stator teeth is increased, positional accuracy of the tips is likely to be reduced. The support member is used to support the tips of the stator teeth to allow the tips of the stator teeth to be supported with high rigidity, and allow high positional accuracy thereof to be maintained.

The inductor motor preferably has an axial length one to four times a diameter thereof.

In this case, the configuration of the inductor motor is particularly effective using the stator having the stator teeth formed by bending the protruding pieces protruding radially outwardly to stand up.

In the second invention, the first rotation shaft and the second rotation shaft may be the same. In this case, one of the magnet rotors is removed in the rotor removing step, and then the second rotor placement step of positioning the stator in the axially intermediate position and again placing and securing the magnet rotor is performed, thereby allowing assembly of the rotor.

As the first rotation shaft, a member different from the second rotation shaft may be used. In this case, both of the magnet rotors need to be removed in the rotor removing step, but a new second rotation shaft may be used to produce the rotor.

Embodiment

This embodiment relates to an inductor motor 1 and a manufacturing method of the inductor motor 1. This will be described with reference to FIGS. 1 to 12.

Figure 2:
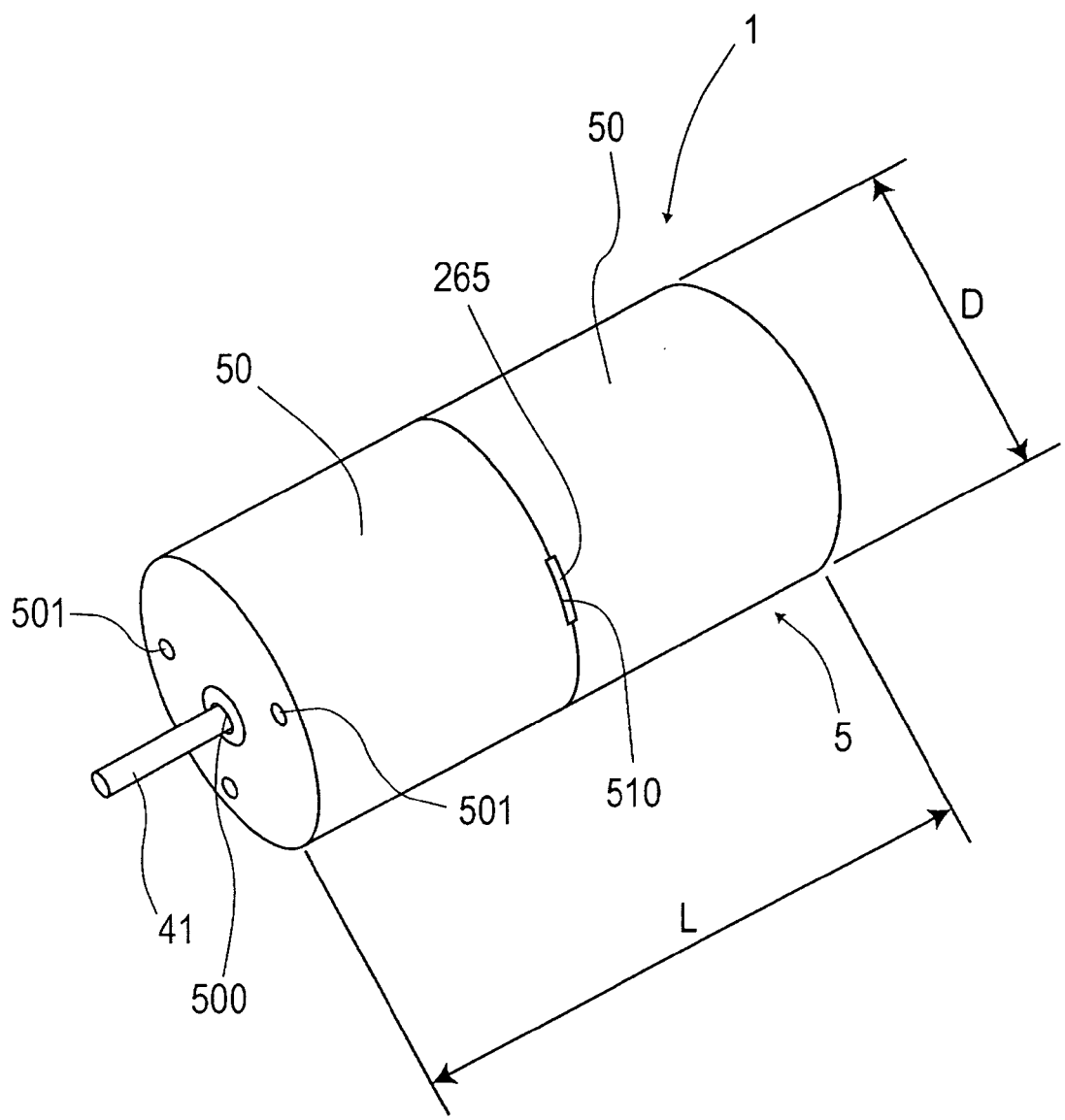
FIG. 2 is a perspective view of the inductor motor in Embodiment 1.
Figure 3:
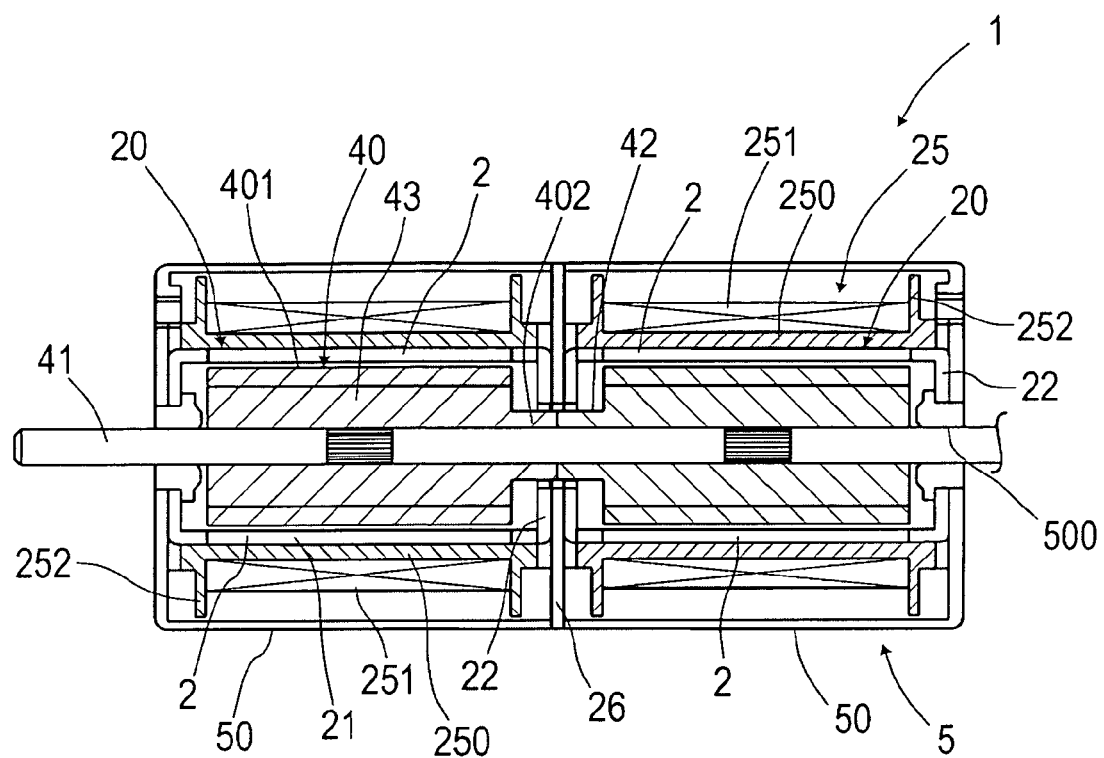
FIG. 3 is a sectional view of a sectional structure of the inductor motor in Embodiment 1.

The inductor motor 1 in the embodiment includes, as shown in FIGS. 1 to 3, a stator 2 having a plurality of stator teeth 21 standing along substantially the same circumference from a substantially flat plate-shaped holding plate portion 22, a stator block 20 including a pair of stators 2 placed to face each other so that the stator teeth 21 circumferentially alternately interdigitate with each other, a substantially cylindrical excitation coil 25 placed around the stator block 20, a rotor 4 including two substantially columnar magnet rotors 40 coaxially arranged, each magnet rotor including a magnet portion 43 in which a magnetized surface 401 having N-poles and S-poles circumferentially alternately arranged thereon is provided on an outer peripheral surface, and a motor case 5 that houses the stator block 20 around which the excitation coil 25 is placed. In the inductor motor 1, two magnet rotors 40 are inserted inside the two stator blocks 20 coaxially arranged.

Each stator 2 is formed of a substantially flat plate-shaped preformed member 29 (see FIG. 6) of a magnetic material having a plurality of protruding pieces 291 circumferentially formed and protruding radially outwardly, and has the stator teeth 21 formed by bending the protruding pieces 291 to stand up.

The rotor 4 has an intermediate circumferential groove 42 (see FIG. 10) with a smaller diameter than the magnet portion 43 between the two magnet rotors 40 coaxially arranged. The holding plate portion 22 of the stator 2 placed on an axially intermediate side of the inductor motor 1 is placed around the intermediate circumferential groove 42 of the rotor 4.

This will be now described in detail.

The inductor motor 1 in the embodiment is, as shown in FIGS. 1 to 3, a so-called permanent magnet brushless six-pole motor. The inductor motor 1 is configured to be rotated by energizing the excitation coil 25 according to a predetermined sequence synchronized with rotation of the rotor 4. The inductor motor 1 is of a small diameter, and includes the motor case 5 having an axial length L of mm and a diameter D of 30 mm. The number of poles of the inductor motor 1 may be twelve, twenty-four or the like besides six in this embodiment.

Figure 4:
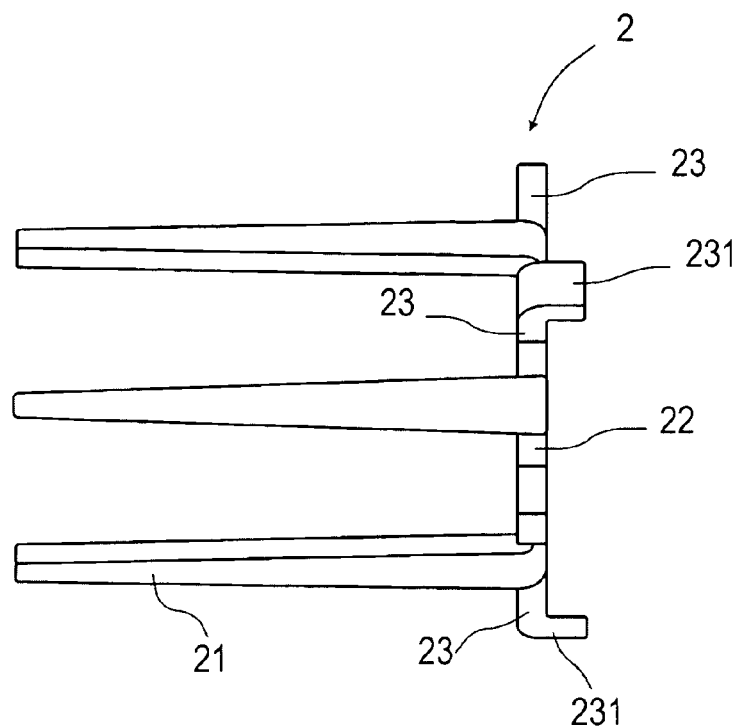
FIG. 4 is a side view of a stator in Embodiment 1.
Figure 5:
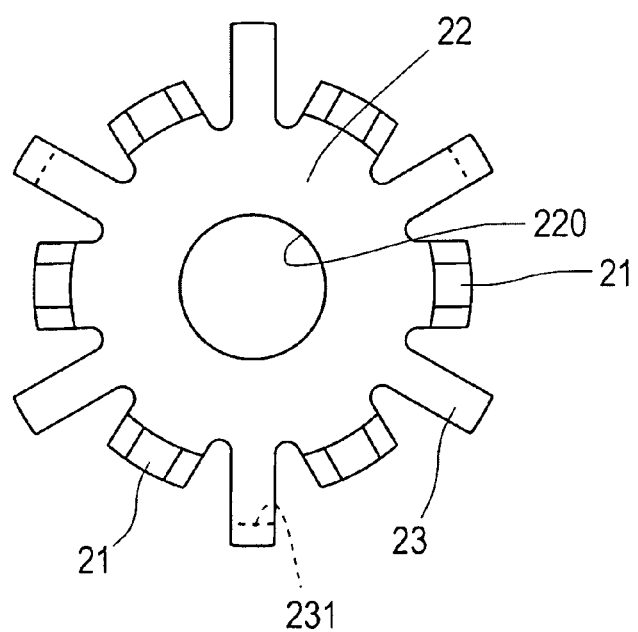
FIG. 5 is a front view of the stator in Embodiment 1.

The stator 2 in the inductor motor 1 includes, as shown in FIGS. 4 and 5, a substantially annular holding plate portion 22 having a through hole 220 at the center, six stator teeth 21 standing from an outer periphery of the holding plate portion 22, and a stabilizer 23 for stabilizing a mounting attitude of the stator 2 in assembly. The stabilizer 23 is formed to protrude radially outwardly from the holding plate portion 22.

The stator 2 in the embodiment is made of a steel sheet SPCE that is a magnetic material. A stator 2 made of other magnetic materials such as SPCD, SGCD or SUYB may be used. Further, in the embodiment, the four stators 2 that constitute the two stator blocks 20 have completely the same specifications. This reduces the number of types of components that constitute the inductor motor 1.

As shown in FIGS. 4 and 5, the six stator teeth 21 of the stator 2 stand from the outer periphery of the holding plate portion 22 so as to be arranged at regular intervals on substantially the same circumference. The six stabilizers 23 are formed at regular intervals in a circumferentially 30° shifted manner from standing positions of the stator teeth 21. Three alternate stabilizers 23 out of six have engagement pins 231 formed by bending radial tips thereof. The engagement pins 231 are formed to protrude toward the side opposite from the protruding direction of the stator teeth 21, and engage a counterpart member (in the embodiment, an intermediate plate 26 in FIG. 7 or a bottom surface of a case member 50).

Figure 6:
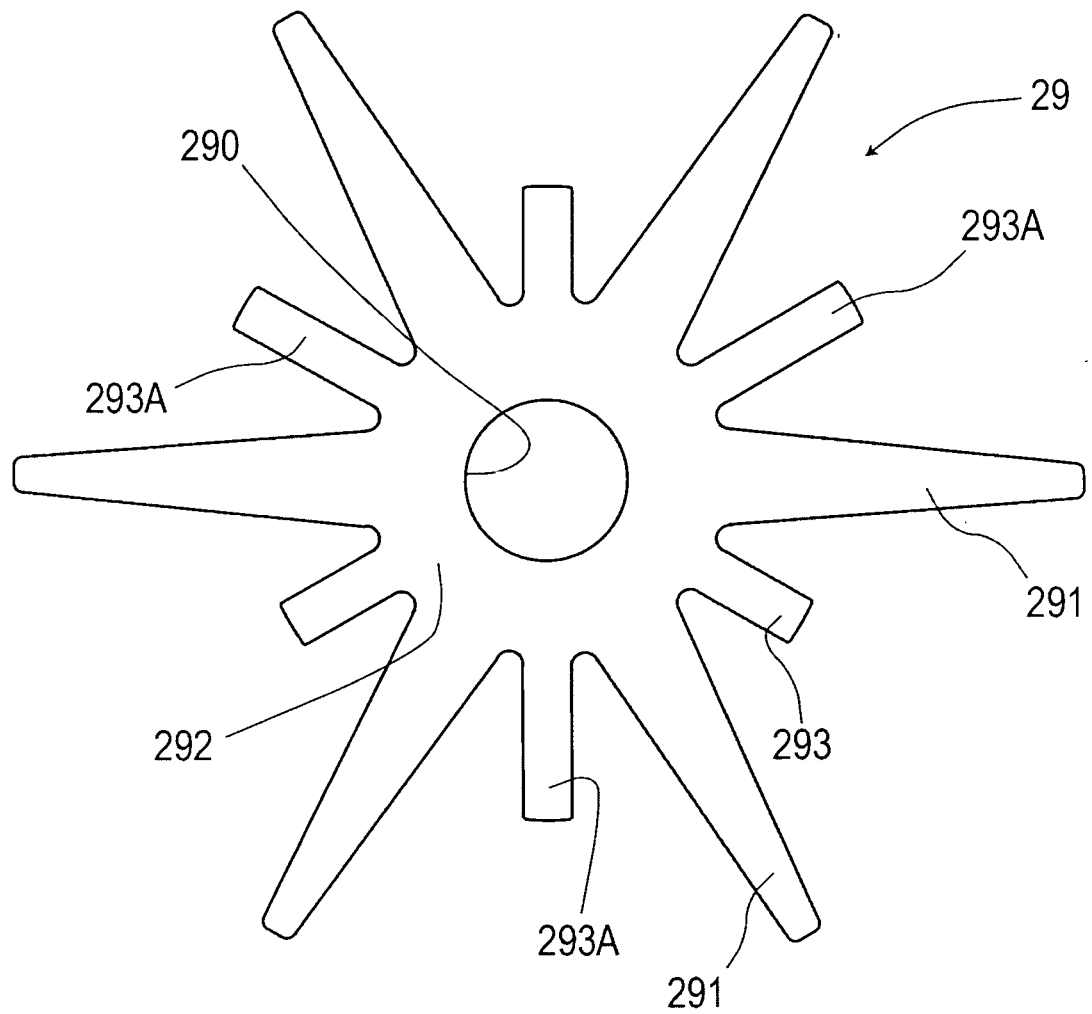
FIG. 6 is a front view of a preformed member in Embodiment 1.

Now, a method of producing the stator 2 in the embodiment will be described. The stator 2 in the embodiment is produced by press working a flat plate-shaped material (not shown) of a magnetic material. In producing the stator 2, the flat plate-shaped material is stamped to obtain a preformed member 29 as shown in FIG. 6. The preformed member 29 includes a substantially annular ring portion 292 having a through hole 290 at the center, protruding pieces 291 protruding radially outwardly from six circumferential positions at regular intervals on an outer periphery of the ring portion 292, and projecting pieces 293 protruding radially outwardly from positions 30° shifted from formation positions of the protruding pieces 291.

The stator 2 in the embodiment is, as shown in FIGS. 4 to 6, formed of the preformed member 29 by bending the protruding pieces 291 and other parts. Specifically, first bending for bending the protruding pieces 291 to stand up from the ring portion 292 to form the stator teeth 21, and second bending for bending tips of three circumferentially alternate projecting pieces 293A among the projecting pieces 293 toward the side opposite from the protruding pieces 291 to form the engagement pins 231 are performed. The holding plate portion 22 in the completed stator 2 is constituted by the ring portion 292. The stator teeth 21 are constituted by the protruding pieces 291. The stabilizers 23 are constituted by the projecting pieces 293, and the engagement pins 231 are formed by bending tips of the projecting pieces 293A.

The excitation coil 25 includes a wire 251 wound around an outer periphery of a substantially cylindrical portion, which has a thin wall, of a bobbin 250 of a non-magnetic material as shown in FIGS. 1 and 3. The bobbin 250 is configured to be placed around the stator block 20 without any radial gap. The bobbin 250 has, at axially opposite ends, side plates 252 having a large diameter for facilitating winding of the wire 251. In the embodiment, the bobbin 250 used is made of resin (PBT) that is a non-magnetic material. The wire 251 used is polyurethane copper wire.

The rotor 4 includes, as shown in FIGS. 1 and 3, a rotation shaft 41 for taking a rotation output of the inductor motor 1, and two magnet rotors 40 placed and secured around the rotation shaft 41. The magnet rotor 40 is configured to be rotatably inserted inside a circle formed by the stator teeth 21 of the stator 2. The magnet rotor 40 has a magnetized surface 401 on which N-poles and S-poles are circumferentially alternately arranged, on a substantially columnar outer peripheral surface. In the embodiment, the magnet rotor 40 used is made of neodymium. The magnet rotor 40 may be made of ferrite, samarium-cobalt, or the like besides the above.

Each magnet rotor 40 has a small diameter portion 402 (see FIG. 9) with a smaller diameter than a magnet portion 43 having the magnetized surface 401, at an end adjacent to the other magnet rotor 40. The small diameter portion 402 has an engagement portion 403 in an end surface thereof that is eccentric and engages a counterpart small diameter portion 402. An engagement portion 403 of one small diameter portion 402 is axially recessed. An engagement portion 403 of the other small diameter portion 402 is projecting so as to fit in the recessed engagement portion 403 (not shown). The engagement portions 403 constitute rotor positioning portions for controlling a relative position in the rotational direction of the magnet rotors 40 with high accuracy.

As shown in FIG. 3, in the rotor 4 in which the two magnet rotors 40 are coaxially arranged with the engagement portions 403 fitted to each other, the small diameter portions 402 of the magnet rotors 40 are integrated to form an intermediate circumferential groove 42. The intermediate circumferential groove 42 is a small diameter portion placed between the magnet portions 43 having the magnetized surfaces 401 in the magnet rotors 40. The intermediate circumferential groove 42 is configured so that the holding plate portions 22 of the stators 2 and an intermediate plate 26 can be placed therearound.

Figure 7:
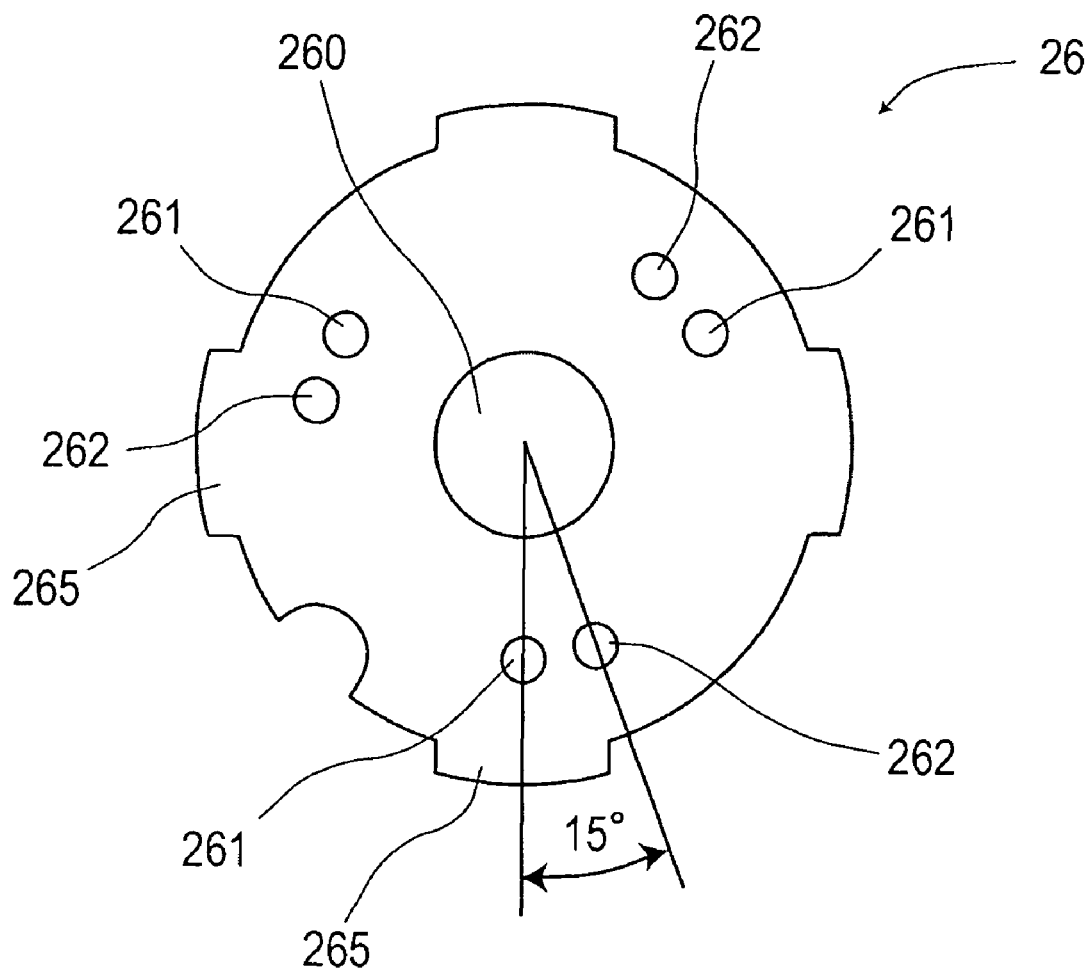
FIG. 7 is a front view of an intermediate plate in Embodiment 1.

As shown in FIG. 7, the intermediate plate 26 is a substantially annular plate-shaped member having an outer diameter substantially equal to an inner diameter of the motor case 5, and an inner diameter larger than an outer diameter of the intermediate circumferential groove 42. The intermediate plate 26 is made of a magnetic material, and constitutes a path magnetically connecting the pair of stators 2 that constitute the stator block 20. In this embodiment, the intermediate plate 26 used is made of SPCE that is a magnetic material.

The intermediate plate 26 is configured to hold the stators 2 on opposite sides thereof. The intermediate plate 26 has engagement holes 261 that receive the engagement pins 231 (see FIG. 4) of the stator 2 held on one surface, at three circumferential positions. The three engagement holes 261 constitute first inner stator positioning portions. Further, the intermediate plate 26 has engagement holes 262 that receive the engagement pins 231 of the stator 2 held on the other surface, at positions circumferentially 15° shifted from the engagement holes 261. The three engagement holes 262 constitute second inner stator positioning portions.

The intermediate plate 26 has a substantially circular through hole 260 on an inner peripheral side as described above. An outer periphery of the intermediate plate 26 is configured so that the case member 50 described later is placed and secured therearound. Further, projecting portions 265 protruding outwardly are provided at four circumferential positions at regular intervals on the outer periphery of the intermediate plate 26. The projecting portions 265 constitute case positioning portions for controlling a circumferential rotational position of the intermediate plate 26 housed in the motor case 5.

In the embodiment, as described above, the engagement holes 261 and 262 as the inner stator positioning portions are provided in one intermediate plate 26. Alternatively, two intermediate plates 26 may be provided so that engagement holes 261 are provided in one intermediate plate and engagement holes 262 are provided in the other intermediate plate.

As shown in FIGS. 1 to 3 and 8, the motor case 5 is divided at an axial center thereof, and includes two substantially closed-end cylindrical case members 50. The case members 50 have common specifications other than placement specifications of outer stator positioning portions (in the embodiment, pinholes 501) described later. First, the common specifications of the case members 50 will be described. In the embodiment, the case member 50 used is made of SPCE. The case member 50 may be made of SPCD, SUYB, SGCD, or the like besides the above.

As shown in FIGS. 1 to 3 and 8, each case member 50 has a shaft hole 500 through which the rotation shaft 41 is passed, substantially at the center of the bottom surface. An opening 51 of the case member 50 is configured to be fitted and secured to the intermediate plate 26. The opening 51 has engagement recesses 510 axially recessed so as to receive the projecting portions 265 (see FIG. 7) of the intermediate plate 26 and provided correspondingly to arrangement positions of the projecting portions 265 of the intermediate plate 26.

As shown in FIGS. 1 to 3 and 8, the case member 50 has, in the bottom surface thereof, the pinholes 501 that are outer stator positioning portions for receiving the engagement pins 231 (see FIG. 4) of the stator 2. The pinholes 501 are placed at three positions at regular intervals on substantially the same circumference around the shaft hole 500. The difference between the case members 50 is in a positional relationship between the engagement recesses 510 and the pinholes 501 in the rotational direction (circumferential direction). Formation positions of the pinholes 501 relative to the engagement recesses 510 in one of the case members 50 are circumferentially 15° shifted with respect to those in the other of the case members 50.

The pinholes 501 in one case member 50 are, as shown in FIGS. 1 to 4, shifted 30° in the rotational direction from the engagement holes 261 in the intermediate plate 26. This allows the stator 2 with the engagement pins 231 engaging the pinholes 501 in the case member 50, and the stator 2 with the engagement pins 231 engaging the engagement holes 261 in the intermediate plate 26 to face each other in a 30° shifted manner in the rotational direction. The stators 2 with the stator teeth 21 provided at 60° intervals face each other in the 30° shifted manner in the rotational direction to allow the stator teeth 21 to interdigitate with each other. The pinholes 501 in the other case member 50 are formed in a 30° shifted manner in the rotational direction from the engagement holes 262 in the intermediate plate 26.

In the embodiment, the motor case 5 includes the two case members 50 having different specifications as described above. Alternatively, the motor case 5 may include case members 50 having the same specifications. Specifically, two sets of three pinholes 501 are drilled in a circumferentially 15° shifted manner, thereby allowing the two case members 50 having the same specifications to constitute the motor case 5. Further, a motor case 5 including a combination of a closed-end substantially cylindrical member formed by deep drawing and deeper than the case member 50 and a lid-shaped member may be used.

Next, an assembling procedure of the components will be described with reference to FIGS. 8 to 11 for more clarification on the configuration of the inductor motor 1 in the embodiment. First, as shown in FIG. 1, the inductor motor 1 in the embodiment is such that the stator block 20 including the pair of stators 2 placed to face each other so that the stator teeth 21 interdigitate with each other and around which the excitation coil 25 is placed, and the rotor 4 including the magnet rotors 40 in which N-poles and S-poles are alternately arranged on the outer peripheral surfaces are assembled to the motor case 5. In the inductor motor 1, the two magnet rotors 40 are individually placed inside the two stator blocks 20 coaxially arranged.

In producing the inductor motor 1, the rotor 4 (see FIG. 11) is produced around which the two stators 2 held by the intermediate plate 26 are placed at the axial center, and having the two magnet rotors 40 placed and secured around the rotation shaft 41. In producing the rotor 4, in the embodiment, as shown in FIGS. 9 to 11, a first rotor placement step of placing and securing only the magnet rotors 40 to a first rotation shaft 411 without the intermediate plate 26 and the stators 2, a rotor magnetizing step of magnetizing the outer peripheral surfaces of the magnet rotors 40 placed and secured around the first rotation shaft 411, a rotor removing step of removing the magnet rotors 40 from the first rotation shaft 411, and a second rotor placement step of placing and securing the magnet rotors 40 together with the intermediate plate 26 and other parts around the second rotation shaft 41 are performed in this order.

Figure 9:
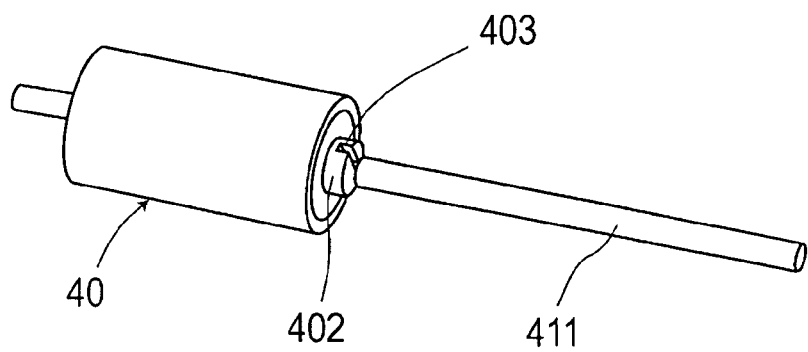
FIG. 9 is a perspective view of a first rotation shaft around which only one magnet rotor is placed in Embodiment 1.
Figure 10:
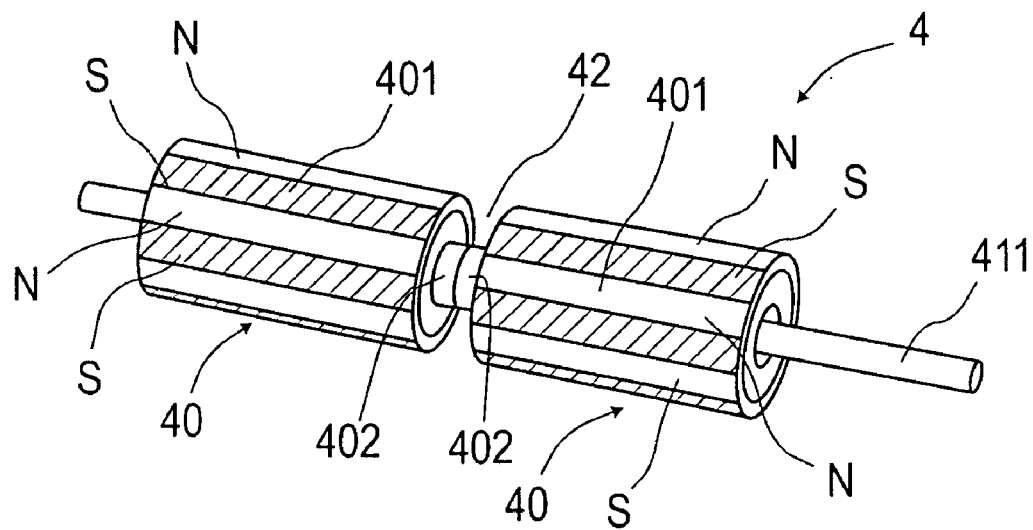
FIG. 10 is a perspective view of the first rotation shaft around which two magnet rotors are placed in Embodiment 1.
Figure 11:
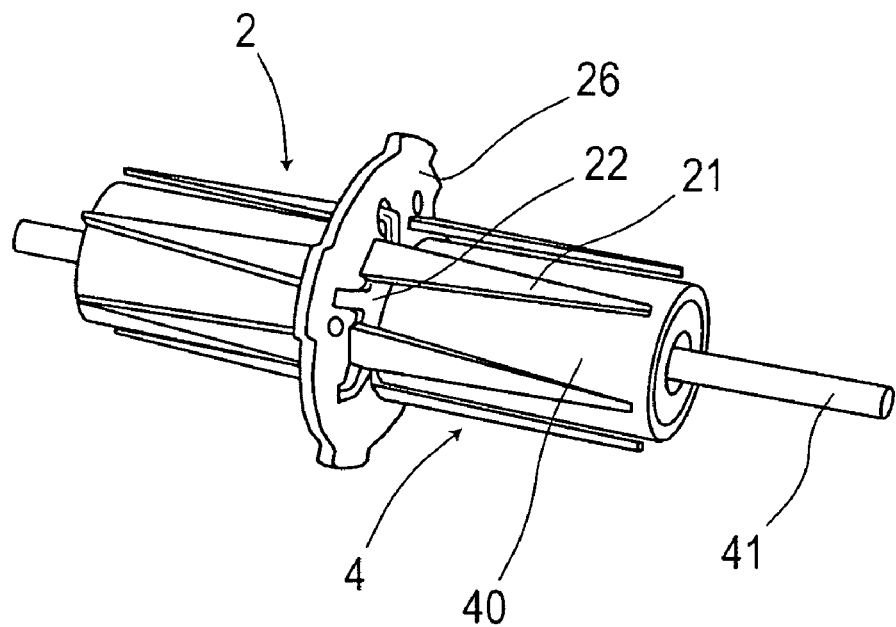
FIG. 11 is a perspective view of a rotor produced by a second rotor placement step in Embodiment 1.

In the first magnet rotor placement step, as shown in FIGS. 9 and 10, two unmagnetized magnet rotors 40 are placed and secured around the first rotation shaft 411 as a production jig. In placing and securing the two magnet rotors 40, the relative position in the rotational direction of the magnet rotors 40 is adjusted so that the engagement portions 403 provided in the end surfaces of the small diameter portions 402 fit each other (the projecting engagement portion 403 and the recessed engagement portion 403 fit each other).

Then, the rotor magnetizing step is performed, and each magnet rotor 40 is multi-pole magnetized to provide a magnetized surface 401 on the outer peripheral, surface thereof. In the rotor magnetizing step, the magnetized surface 401 on which six N-poles and S-poles are circumferentially alternately arranged is formed on the outer peripheral surface of each magnet rotor 40. In the rotor magnetizing step in the embodiment, the two magnet rotors 40 coaxially arranged are magnetized so that formation positions of the magnetic poles in the rotational direction (circumferential direction) are the same.

Then, the rotor removing step is performed, the two magnetized magnet rotors 40 are removed from the first rotation shaft 411 as the production jig, and the second rotor placement step is performed. The second rotor placement step is a step of placing the two magnetized magnet rotors 40 around the second rotation shaft 41 with the intermediate plate 26 holding the two stators 2 placed at the axial center.

In the second rotor placement step, as shown in FIG. 11, the intermediate plate 26 holding the stators 2 on the opposite sides is placed around the second rotation shaft that is the rotation shaft 41 of the rotor 4. For the intermediate plate 26 to hold the stators 2, as described above, the engagement pins 231 (see FIG. 5) of one stator 2 are engaged with the three engagement holes 261 (see FIG. 7) in one side of the intermediate plate 26, and the engagement pins 231 of the other stator 2 are engaged with the three engagement holes 262 in the other side. As described above, the drilling positions of the engagement holes 261 and the engagement holes 262 are circumferentially shifted 15°. Thus, the two stators 2 are held by the intermediate plate 26 as described above to allow the stators 2 to be circumferentially shifted 15°.

Then, the magnetized magnet rotors 40 are placed from the opposite ends of the rotation shaft 41 around which the intermediate plate 26 is placed. In placing the magnet rotors 40 around the rotation shaft 41, the small diameter portion 402 provided at one end of the magnet rotor 40 is a tip in a insertion direction. The magnet rotor 40 is placed and secured from one end, and then the other magnet rotor 40 is placed from the other end.

As the order of placing the stator 2 and the intermediate plate 26, and the magnet rotors 40 around the rotation shaft 41, instead of the above described order, it is allowed that one magnet rotor 40 is placed, then the stator 2 and the intermediate plate 26 are placed, and then the other magnet rotor 40 is placed.

The through hole 220 (FIG. 5) in the holding plate portion 22 of the stator 2 and the through hole 260 (FIG. 7) in the intermediate plate 26 have a smaller diameter than the magnet portion 43 that constitutes a main body of the magnet rotor 40 (FIG. 10) and have a larger diameter than the small diameter portion 402. Thus, the rotor 4 obtained by the second rotor placement step is, as shown in FIG. 11, such that the intermediate plate 26 and other parts is fitted and placed around the intermediate circumferential groove 42 having a small diameter formed by the small diameter portions 402 of the two magnet rotors 40.

In abutment between the small diameter portions 402 of the magnet rotors 40, as in the first rotor placement step, the small diameter portions 402 are abutted against each other so that the engagement portions 403 fit each other. Thus, by the second rotor placement step, the relative position in the rotational direction of the magnet rotors 40 can be set substantially the same as in performing the rotor magnetizing step. Thus, the rotor 4 of the inductor motor 1 ensures high positional accuracy in the rotational direction of the magnet rotors 40 placed and secured. By the second rotor placement step in the embodiment, the risk that the formation positions of the magnetic poles arranged on the magnetized surfaces 401 are shifted in the rotational direction in placing the magnet rotors 40 is extremely low.

Figure 8:
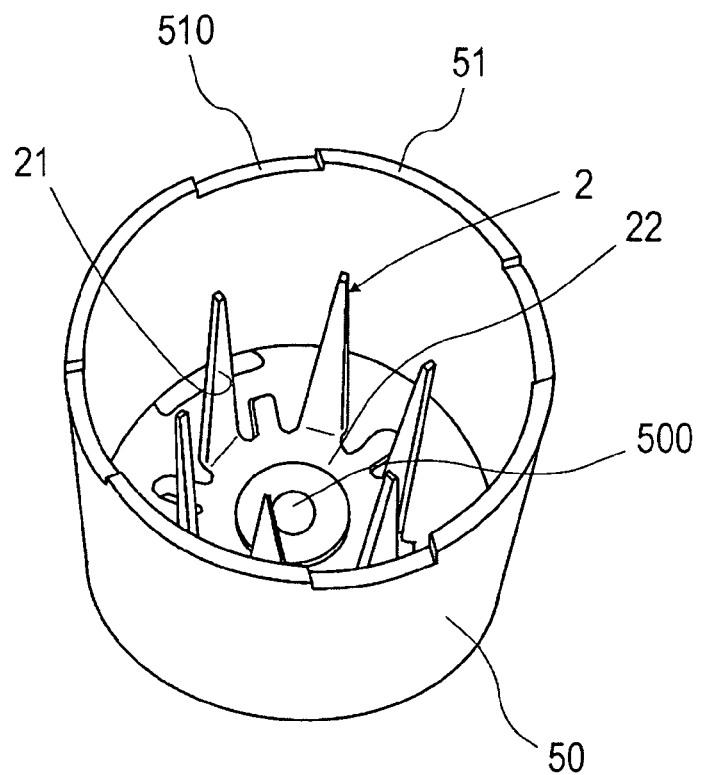
FIG. 8 is a perspective view of a case member to which the stator is assembled in Embodiment 1.

Then, as shown in FIG. 1, a final assembly step is performed of assembling the stators 2 placed on the axially opposite sides and the excitation coil 25 and other parts to the rotor 4 assembled as described above, and housing the assembly in the motor case 5. In performing the final assembly step, as shown in FIG. 8, the stator 2 and the excitation coil 25 are previously assembled to each case member 50. The stator 2 is herein assembled so that the engagement pins 231 engage the three pinholes 501 provided in the bottom surface of the case member 50. Further, the excitation coil 25 is assembled so as to be placed around the stator 2 assembled to the case member 50.

Then, in the final assembly step, as shown in FIGS. 1 and 2, the case members 50 are assembled from the opposite ends of the rotor 4. At this time, the openings 51 of the case members 50 are fitted and secured to the intermediate plate 26 in a state where the projecting portions 265 provided in the outer periphery of the intermediate plate 26 assembled to the rotor 4 and the engagement recesses 510 provided in the openings 51 of the case members 50 fit each other.

The stator 2 held by the case member 50 is controlled in position in the rotational direction relative to the case member 50 by engagement between the engagement pins 231 (FIG. 4) and the pinholes 501 (FIG. 1). On the other hand, the stator 2 held by the intermediate plate 26 is controlled in circumferential position relative to the intermediate plate 26 by engagement between the engagement pins 231 (FIG. 4) and the engagement holes 261 or 262 (FIG. 7). Further, the relative position in the rotational direction of the intermediate plate 26 and the case member 50 is controlled by engagement between the projecting portions 265 (FIG. 7) provided in the outer periphery of the intermediate member 26 and the engagement recesses 510 (FIG. 8) provided in the opening 51 of the case member 50.

Thus, as described above, the rotor 4 is housed in the case member 50 so that the projecting portions 265 and the engagement recesses 510 engage each other, and thus the stators 2 that constitute the stator block 20 can be controlled in the relative position in the rotational direction and placed to face each other so that the stator teeth 21 thereof interdigitate with each other.

As described above, in the embodiment, the formation positions in the rotational direction of the pinholes 501, and the engagement holes 261 and 262 in the intermediate plate 26, in one of the case members 50 are shifted 15° with respect to those in the other of the case members 50. Thus, in the inductor motor 1 in the embodiment, the two stator blocks 20 axially arranged can be placed in a 15° shifted manner in the rotational direction.

As described above, the stator 2 in the inductor motor 1 in the embodiment is formed of the substantially flat plate-shaped preformed member 29 having the plurality of protruding pieces 291 circumferentially formed and protruding radially outwardly. The stator teeth 21 of the stator 2 are formed by bending the protruding pieces 291 of the preformed member 29 to stand up. A protrusion length of each protruding piece 291 of the preformed member 29 can be freely set without depending on size specifications such as a diameter of the stator 2 as a finished component. Thus, in the stator 2 including the stator teeth 21 formed by the standing protruding pieces 291 in the embodiment, the protrusion length of the stator teeth 21 can be freely set independently of outer diameter specifications or the like required for the inductor motor 1.

In the inductor motor 1 in the embodiment in which the protrusion length of the stator teeth 21 can be set independently of the outer diameter specifications, the axial length thereof can be increased to sufficiently ensure an output even with a small diameter. Specifically, for example, an increase in the protrusion length of the stator teeth 21 can achieve a high output characteristic even when the outer diameter of the inductor motor 1 is reduced.

Further, in the manufacturing method of the inductor motor 1 in the embodiment, the second rotor placement step performed as a post-step of the first rotor placement step, the rotor magnetizing step, and the rotor removing step is a step of placing and securing the magnet rotors 40 while using the engagement portions 403 that are the rotor positioning portions to control the relative position in the rotational direction with high accuracy like the first rotor placement step. By the second rotor placement step, the relative position in the rotational direction of the magnetized magnet rotors 40 can be reproduced with high accuracy. Thus, according to the manufacturing method of the inductor motor in the embodiment, a product having excellent characteristics as in design specifications can be produced.

Figure 12:
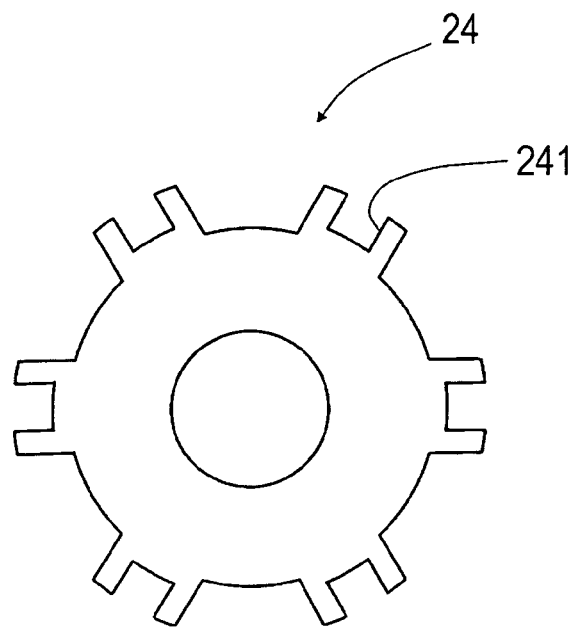
FIG. 12 is a front view of a support member in Embodiment 1.

As shown in FIG. 12, a support member 24 formed of a substantially annular flat plate-shaped non-magnetic material and having teeth receiving portions 241 that are provided at six circumferential positions and receive the tips of the stator teeth 21 may be used. The support member 24 is held by the stator 2 so as to abut against the surface of the holding plate portion 22, and thus the tips of the stator teeth 21 of the other stator 2 that constitutes the stator block 20 can be received in the teeth receiving portions 241. The support member 24 thus supports the tips of the stator teeth 21 to allow the stator teeth 21 to be supported with high rigidity and increase positional accuracy of the tips.

Figure 13:
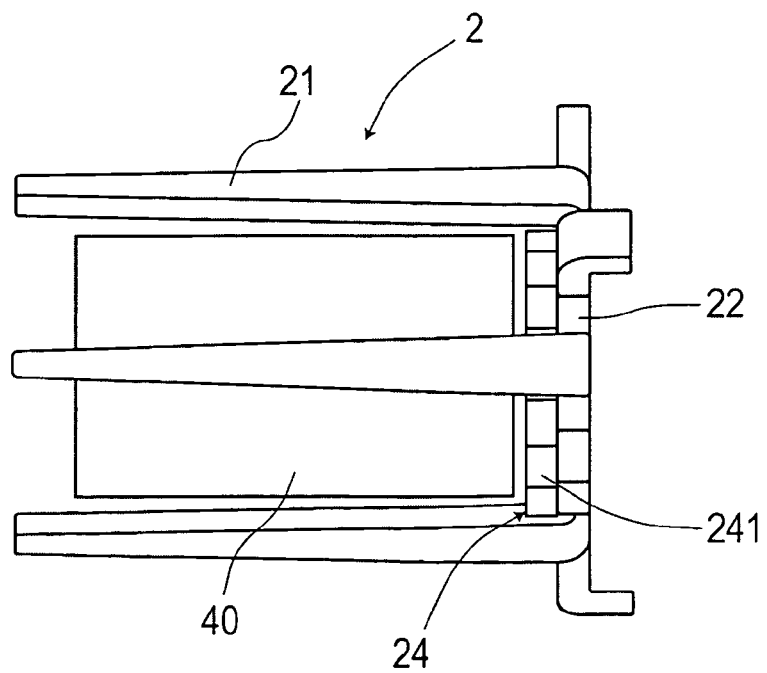
FIG. 13 illustrates a state of assembly of the support member in Embodiment 1.
Figure 14:
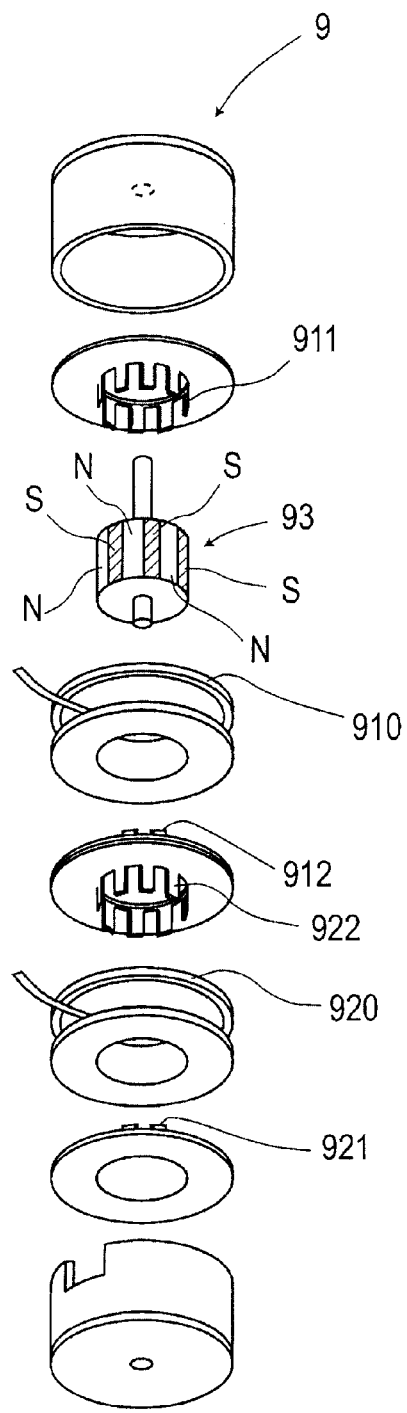
FIG. 14 is an assembly drawing of an assembly structure of a conventional inductor motor.
Figure 15:
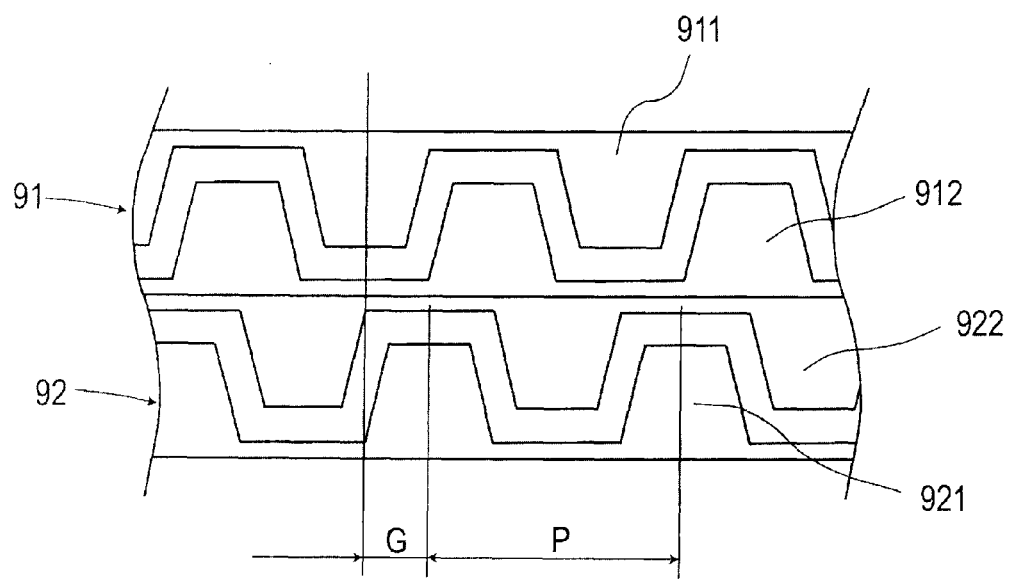
FIG. 15 is an unrolled view of an interdigitating structure of stator teeth in the conventional inductor motor unrolled on a plane.

As shown in FIG. 13, the axial length of the stator teeth 21 may be slightly longer than the axial length of the magnet rotor 40. In this case, the support member 24 may be placed in a gap between the end surface of the magnet rotor 40 and the holding plate portion 22. Further, the support member 24 may be made of aluminum, resin, brass, or the like that are non-magnetic materials.

The intermediate plate 26 may be formed of a non-magnetic material, and the stabilizer 23 of the stator 2 placed on the an axially intermediate side of the inductor motor 1 may be radially extended to be brought into contact with the inner peripheral surface of the case member 50. Also, the intermediate plate 26 may be eliminated. In this case, the stator 2 may be held by the case member 50 using the radially extended portion of the stabilizer 23.

FIG. 1

| | |
|---|---|
| 1 | inductor motor |
| 2 | stator |
| 20 | stator block |
| 21 | stator teeth |
| 22 | holding plate portion |
| 25 | excitation coil |
| 4 | rotor |
| 40 | magnet rotor |
| 401 | magnetized surface |
| 5 | motor case |

The invention claimed is:

1. An inductor motor comprising:
a stator having a plurality of stator teeth standing along substantially the same circumference from a substantially flat plate-shaped holding plate portion;
a stator block including a pair of stators placed to face each other so that the stator teeth circumferentially alternately interdigitate with each other;
a substantially cylindrical excitation coil placed around the stator block;
a rotor including two substantially columnar magnet rotors coaxially arranged, each magnet rotor including a magnet portion in which a magnetized surface having north (N) poles and south (S) poles circumferentially alternately arranged thereon is provided on an outer peripheral surface; and
a motor case that houses the stator block around which the excitation coil is placed, the two magnet rotors being placed inside the two stator blocks coaxially arranged respectively,
characterized in that each of the stators is formed of a substantially flat plate-shaped preformed member of a magnetic material having a plurality of protruding pieces circumferentially formed and protruding radially outwardly, and has the stator teeth formed by bending the protruding pieces to stand up, and
the rotor has an intermediate circumferential groove with a smaller diameter than the magnet portion between the two magnet rotors coaxially arranged, and the holding plate portion of the stator placed on an axially intermediate side of the inductor motor is placed around the intermediate circumferential groove.

2. The inductor motor according to claim 1, characterized in that the inductor motor has an axial length one to four times a diameter thereof.

3. The inductor motor according to claim 1, characterized in that at least any of the stators holds a support member of a non-magnetic material configured to support tips of the stator teeth of the other stator that constitutes the stator block.

4. The inductor motor according to claim 1, characterized in that the holding plate portions of the two stators placed on the axially intermediate side of the inductor motor, and a substantially flat plate-shaped intermediate plate configured to hold the holding plate portions on front and back surfaces thereof are placed around the intermediate circumferential groove of the rotor, and
the pair of stators placed to face each other are magnetically connected via the intermediate plate of a magnetic material in the each stator block.

5. The inductor motor according to claim 4, characterized in that at least any of the stators holds a support member of a non-magnetic material configured to support tips of the stator teeth of the other stator that constitutes the stator block.

6. The inductor motor according to claim 4, characterized in that the intermediate plate includes inner stator positioning portions that control positions in a rotational direction of the stators held by the holding plate portions.

7. The inductor motor according to claim 6, characterized in that the motor case includes two case members having outer stator positioning portions that control the positions in the rotational direction of the stators placed on the axially opposite sides of the inductor motor, and
the intermediate plate has a case positioning portion that controls positions in a rotational direction of the case members.

8. The inductor motor according to claim 7, characterized in that the inductor motor has an axial length one to four times a diameter thereof.

9. The inductor motor according to claim 8, characterized in that at least any of the stators holds a support member of a non-magnetic material configured to support tips of the stator teeth of the other stator that constitutes the stator block.

10. A manufacturing method of an inductor motor comprising: a stator having a plurality of stator teeth standing along substantially the same circumference from a substantially flat plate-shaped holding plate portion; a stator block including a pair of stators placed to face each other so that the stator teeth circumferentially alternately interdigitate with each other; a substantially cylindrical excitation coil placed around the stator block; a rotor including two magnet rotors coaxially arranged, each magnet rotor including a magnet portion in which a magnetized surface having north (N) poles and south (S) poles circumferentially alternately arranged thereon is provided on an outer peripheral surface, and having an intermediate circumferential groove with a smaller diameter than the magnet portion between the magnet rotors; and a motor case that houses the stator block around which the excitation coil is placed, the two magnet rotors being placed inside the two stator blocks coaxially arranged respectively,
characterized in that the method comprises:
a first rotor placement step of placing and securing the magnet rotors around a first rotation shaft, each magnet rotor having a rotor positioning portion that controls a relative position in a rotational direction to the other magnet rotor that constitutes the rotor;
a rotor magnetizing step of magnetizing outer peripheral surfaces of the magnet rotors placed and secured around the first rotation shaft to form the magnetized surfaces;
a rotor removing step of removing at least one of the magnetized magnet rotors from the first rotation shaft; and
a second rotor placement step of placing and securing the magnetized magnet rotors around a second rotation shaft so that the holding plate portions of the two stators placed with the stator teeth directed in opposite directions are placed around the intermediate circumferential groove, and
the relative position in the rotational direction of the magnet rotors is controlled by the rotor positioning portion in the first and second rotor placement steps.

* * * * *